(12) United States Patent
Hashem et al.

(10) Patent No.: US 7,798,536 B2
(45) Date of Patent: Sep. 21, 2010

(54) REVERSE SLIDING SEAL FOR EXPANDABLE TUBULAR CONNECTIONS

(75) Inventors: Ghazi J. Hashem, Houston, TX (US); Simon J. Harrall, Houston, TX (US); Lev M. Ring, Houston, TX (US); Merle E. Evans, Spring, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 751 days.

(21) Appl. No.: 11/201,499

(22) Filed: Aug. 11, 2005

(65) Prior Publication Data

US 2007/0035130 A1 Feb. 15, 2007

(51) Int. Cl.
*F16L 13/14* (2006.01)
(52) U.S. Cl. .................. 285/382.2; 285/333; 285/382.1
(58) Field of Classification Search .................. 285/333, 285/334, 382, 382.1, 382.2, 382.4, 382.5, 285/390
See application file for complete search history.

(56) References Cited

U.S. PATENT DOCUMENTS

| 1,460,769 | A | 7/1923 | Saunders |
|---|---|---|---|
| 2,005,631 | A | 6/1935 | Pace |
| 2,065,595 | A | 12/1936 | Lynch |
| 2,494,128 | A | 1/1950 | Holmquist et al. |
| 2,980,451 | A | 4/1961 | Taylor et al. |
| 3,047,316 | A | 7/1962 | Wehring et al. |
| 3,067,593 | A | 12/1962 | McCool |
| 3,080,179 | A | 3/1963 | Huntsinger |
| 3,475,038 | A | 10/1969 | Matherne |
| 3,489,437 | A | 1/1970 | Duret |
| 3,508,771 | A | 4/1970 | Duret |
| 3,870,351 | A | 3/1975 | Matsuki |

(Continued)

FOREIGN PATENT DOCUMENTS

EP 0127560 1/1990

(Continued)

OTHER PUBLICATIONS

Scott, et al. "2002 Tubing Reference Tables," *World Oil*, pp. T-3-T-10 (Jan. 2002).

(Continued)

*Primary Examiner*—James M Hewitt
(74) *Attorney, Agent, or Firm*—Howrey LLP

(57) ABSTRACT

An expandable threaded connection between segments of expandable tubulars that provides a high bearing pressure seal at a specific area along the pin and box members is disclosed. The invention utilizes a "groove" in a surface of the box member and a corresponding "rib" on the pin nose. The radial expansion of the tubulars causes the pin to become shorter in length, thereby causing the pin nose to retract from the back of the box member. As the pin nose retracts, the rib on the pin nose moves backward until a portion of the rib contacts a portion of the groove in the box member. The point of contact between the rib and the groove creates a metal-to-metal seal between the pin and box members. Because the point of contact between the rib and the groove is a relatively small area, the force acting on the point of contact generates a high bearing pressure that is equal to or greater than the internal pressure within the expandable tubulars and, thus, generates a high pressure seal.

33 Claims, 3 Drawing Sheets

U.S. PATENT DOCUMENTS

| | | | |
|---|---|---|---|
| 3,989,284 A | 11/1976 | Blose | |
| 4,253,687 A | 3/1981 | Maples | |
| 4,317,585 A | 3/1982 | Boice | |
| RE31,123 E | 1/1983 | Simmons | |
| 4,601,491 A | 7/1986 | Bell, Jr. et al. | |
| 4,611,838 A * | 9/1986 | Heilmann et al. | 285/331 |
| 4,619,472 A * | 10/1986 | Kozono et al. | 285/334 |
| 4,629,221 A * | 12/1986 | Lumsden et al. | 285/328 |
| 4,629,225 A | 12/1986 | Rowsey | |
| 4,648,627 A | 3/1987 | Reimert | |
| 4,674,773 A | 6/1987 | Stone et al. | |
| 4,676,528 A | 6/1987 | Gray | |
| 4,676,529 A | 6/1987 | McDonald | |
| 4,688,828 A | 8/1987 | Shaffer | |
| 4,703,959 A | 11/1987 | Reeves et al. | |
| 4,707,001 A | 11/1987 | Johnson | |
| 4,822,081 A | 4/1989 | Blose | |
| 4,846,507 A | 7/1989 | Geary | |
| 4,893,658 A | 1/1990 | Kimura et al. | |
| 4,958,862 A | 9/1990 | Cappelli et al. | |
| 5,348,095 A | 9/1994 | Worrall et al. | |
| 5,415,441 A | 5/1995 | Kilgore et al. | |
| 5,427,418 A | 6/1995 | Watts | |
| 5,681,059 A * | 10/1997 | Mackie | 285/94 |
| 5,826,921 A * | 10/1998 | Woolley | 285/334 |
| 5,924,745 A | 7/1999 | Campbell | |
| 5,954,374 A | 9/1999 | Gallagher et al. | |
| 5,964,486 A * | 10/1999 | Sinclair | 285/331 |
| 5,984,568 A | 11/1999 | Lohbeck | |
| 6,042,153 A | 3/2000 | DeLange et al. | |
| 6,112,818 A | 9/2000 | Campbell | |
| 6,123,368 A | 9/2000 | Enderle | |
| 6,273,474 B1 | 8/2001 | DeLange et al. | |
| 6,322,109 B1 | 11/2001 | Campbell et al. | |
| 6,322,110 B1 * | 11/2001 | Banker et al. | 285/334 |
| 6,328,113 B1 | 12/2001 | Cook | |
| 6,409,175 B1 | 6/2002 | Evans et al. | |
| 6,425,444 B1 | 7/2002 | Metcalfe et al. | |
| 6,454,013 B1 | 9/2002 | Metcalfe | |
| 6,457,532 B1 | 10/2002 | Simpson | |
| 6,510,896 B2 | 1/2003 | Bode et al. | |
| 6,604,763 B1 | 8/2003 | Cook et al. | |
| 6,607,220 B2 | 8/2003 | Sivley, IV | |
| 6,619,696 B2 | 9/2003 | Baugh et al. | |
| 6,626,471 B2 | 9/2003 | Mallis | |
| 6,681,875 B2 | 1/2004 | Larsson et al. | |
| 6,695,012 B1 | 2/2004 | Ring et al. | |
| 6,712,401 B2 | 3/2004 | Coulon et al. | |
| 6,722,443 B1 | 4/2004 | Metcalfe | |
| 6,745,845 B2 | 6/2004 | Cook et al. | |
| 6,752,436 B1 * | 6/2004 | Verdillon | 285/333 |
| 6,767,035 B2 * | 7/2004 | Hashem | |
| 6,905,150 B2 * | 6/2005 | Carcagno et al. | 285/334 |
| 6,971,685 B2 * | 12/2005 | Hashem | 285/333 |
| 7,107,663 B2 | 9/2006 | Ellington et al. | 29/523 |
| 2002/0163192 A1 * | 11/2002 | Coulon et al. | 285/331 |
| 2003/0067166 A1 | 4/2003 | Sivley, IV | |
| 2003/0075924 A1 * | 4/2003 | Olivier | 285/331 |
| 2003/0107213 A1 * | 6/2003 | Baugh et al. | 285/92 |
| 2003/0234538 A1 | 12/2003 | Hashem | 285/333 |
| 2004/0017081 A1 | 1/2004 | Simpson et al. | |
| 2004/0104575 A1 | 6/2004 | Ellington et al. | |
| 2004/0174017 A1 | 9/2004 | Brill et al. | |
| 2004/0262919 A1 * | 12/2004 | Dutilleul et al. | 285/333 |
| 2005/0087983 A1 * | 4/2005 | Verger et al. | 285/333 |
| 2005/0212290 A1 * | 9/2005 | Durand et al. | 285/333 |
| 2005/0236834 A1 * | 10/2005 | Curley et al. | 285/333 |
| 2007/0035127 A1 | 2/2007 | Benzie | 285/294 |
| 2007/0035131 A1 | 2/2007 | Benzie | 285/333 |
| 2007/0035132 A1 | 2/2007 | Benzie | 285/334 |
| 2007/0102927 A1 * | 5/2007 | Dubedout et al. | 285/382 |
| 2007/0187951 A1 * | 8/2007 | Roussie et al. | 285/333 |
| 2008/0007060 A1 * | 1/2008 | Simpson et al. | 285/334 |

FOREIGN PATENT DOCUMENTS

| | | |
|---|---|---|
| EP | 1106778 | 6/2001 |
| EP | 1179700 | 5/2005 |
| FR | 2 863 029 A1 | 11/2003 |
| GB | 2361724 | 10/2001 |
| GB | 2394236 | 4/2004 |
| GB | 2430457 | 5/2008 |
| WO | WO98/42947 | 3/1998 |
| WO | WO01/04520 | 1/2001 |
| WO | WO 01/04535 A1 | 1/2001 |
| WO | WO01/18353 | 3/2001 |
| WO | WO 03/060370 A1 | 7/2003 |
| WO | WO 2005/064217 A1 | 7/2005 |
| WO | WO 2005/064218 A1 | 7/2005 |
| WO | WO 2005/064219 A1 | 7/2005 |

OTHER PUBLICATIONS

Rucker/Atlas Bradford; *Tubing String Design Manual* 9 pages (revised Jul. 1972).

General Administrative and Export Office. Atlas Bradford Company. p. 1. (1970-1971).

Robert E. Snyder. "How Shell Completes Deep Smackover Sour Gas Wells". pp. 85-88. (Oct. 1971).

Scott et al. "VAM-PRO A Premium That Cuts Rig Operational Costs," *World Oil*, pp. 103-146 (Oct. 1995).

Hydril Series 500. "The Wedge Thread". Hydril Tubular Products Division. pp. 1-5. (1985).

* cited by examiner

REVERSE SLIDING SEAL FOR EXPANDABLE TUBULAR CONNECTIONS

FIELD OF THE INVENTION

The present invention relates to threaded tubular connections particularly useful in the oil and gas industry. In particular, the invention relates to an expandable tubular threaded connection having a high bearing pressure metal-to-metal seal formed as a result of the tubular expansion process that allows the threaded connection to withstand high pressure after expansion.

BACKGROUND OF THE INVENTION

In the conventional drilling of an oil and gas well, a series of tubulars, typically strings of casing, liner, and/or screen segments connected together, are sequentially installed in the well bore until the depth of the producing zone of the formation is reached. Standard practice requires that each succeeding string of tubulars placed in the well bore has an outside diameter smaller than the preceding string of tubulars and/or bore hole such that the tubular segments can be passed through the preceding string of tubulars and/or bore hole to their downhole location. The reduction in the diameter of each successive string of tubular segments placed in the well bore results in a significant reduction in the diameter of the tubular through which hydrocarbons can be carried to the surface. More importantly, to achieve the desired tubular diameter in the producing zone, the initial bore hole size at the surface must be sufficiently large to allow for a large diameter casing. The large initial bore hole size requires increased drilling time and increased material costs, including increased use of materials such as drilling mud and casing cement.

The technology of expandable tubulars addresses these shortcomings in the conventional casing/liner/screen hanging operations. Through radial expansion of successive strings of tubular segments until the outer wall of those segments contacts the inner wall of the host pipe, it is possible to create a tight fit between the expandable tubulars and the host pipe that holds the tubular segments in place and creates an annular seal. Further, it is possible to achieve a well bore of virtually uniform diameter (i.e., a monobore well). The expandable tubulars are radially expanded by various means known in the art, including, but not limited to, pulling or pushing fixed diameter expansion cones through the tubular, extruding the tubular off of a hydraulically-actuated expansion tool, or rotating an expansion tool while pulling or pushing it through the tubular.

The tubular segments to be expanded are typically coupled together using threaded connections in which the male end, or pin member, of one tubular is threadably connected to the female end, or box member, of an adjacent tubular. Alternatively, the ends of the adjacent tubulars may have a pin member at each end, with the box member being formed by a short coupling threaded onto one of the pin members. When a conventional threaded connection is made up, the nose of the pin member is in contact with the back of the box member. This threaded engagement between properly secured pin and box members creates a conventional tubular joint that effectively maintains a secure mechanical connection that holds the tubular segments together and that effectively seals the internal tubular area from the formation and vice versa. Often, the sealing ability of the threaded engagement is augmented through the use of Teflon® rings or other deformable seal rings entrapped in the thread area.

Problems have arisen, however, at the threaded connection point between tubular segments during and after expansion when using conventional threaded tubular connections and seals currently available in the industry. When the tubular string is radially expanded, a conventional threaded connection changes dimensionally in a way that can prevent the pin and box members from maintaining proper engagement and sealing. The radial expansion of a conventional threaded connection can cause the pin and box members to radially separate, thereby causing the seal of the threaded engagement to fail. In effect, the radial expansion disables the seal that is created by the metal-to-metal engagement of the sealing surfaces of the pin and box members, and degrades or lowers the pressure holding integrity of the connections. The threaded connection point thus becomes a source of potential leaks during and after expansion of the tubular string.

Conventional threaded connections that use an elastomeric seal ring between the engaged surfaces of the pin and box members may also leak when the threaded connection is radially expanded. Typically, the elastomeric seal ring of a conventional threaded connection is carried in an annular groove formed in either the pin or box member, or both. The elastomeric seal ring creates a seal when it is "energized" by being radially compressed between the engaged pin and box members during make up of the connection. Radial expansion of the threaded connection, however, changes the radial compression of the elastomeric seal ring, thereby potentially allowing leakage through the threaded connection.

Additionally, the radial expansion of the tubular string causes the pin and box members to undergo axial movement. The amount of axial movement experienced by the pin and box members is dependent on numerous factors, including, but not limited to, the amount of radial expansion of the tubular string, the geometry of the threaded connection (the pin is thinner towards the pin end and the box is thinner towards the face of the box), and the type of expansion tool utilized to expand the connection (i.e., use of a rotary expansion tool versus pulling or pushing an expansion tool through the expandable tubulars). For example, in the case of moving or displacing an expansion "cone" through the expandable tubulars, the pin nose tends to pull away and separate from the back of the box. The resulting gap formed between the pin nose and the back of the box as a result of the axial movement of the pin nose creates a potential source of leakage through the threaded connection during and after the expansion process.

As deeper wells and more difficult completions are attempted using expandable tubulars, the threaded connections that hold the expandable tubulars together must address these known problems and must be able to accommodate the higher pressures faced in such applications. What is needed is a threaded connection for expandable tubulars that enhances the pressure integrity of the connections so that they will withstand high pressure after expansion, while not weakening the coupling strength of the connections. It is an object of the present invention to provide an apparatus and method for creating a threaded connection between segments of expandable tubulars that enhances the pressure integrity of the expanded connection while not weakening the coupling strength of the connection. Those and other objectives will become apparent to those of skill in the art from a review of the specification below.

SUMMARY OF THE INVENTION

An expandable threaded connection between segments of expandable tubulars that provides a high bearing pressure seal between the pin and box members is disclosed. The present invention is a unique expandable threaded connection in which expansion of the tubulars creates a high pressure seal between the pin and box members. The invention utilizes a "groove" in a surface of the box member and a corresponding "rib" on the pin nose. The radial expansion of the tubulars via an expansion cone or via hydraulic pressure causes the pin to become shorter in length, thereby causing the pin nose to retract from the back of the box member. As the pin nose retracts, the rib on the pin nose moves backward until a portion of the rib contacts a portion of the groove in the box member. The point of contact between the rib and the groove creates a metal-to-metal seal between the pin and box members. Because the point of contact between the rib and the groove is a relatively small area, the force acting on the point of contact generates a high bearing pressure that is equal to or greater than the internal pressure within the expandable tubulars and, thus, generates a high pressure seal. Additionally, the contact between the rib and the groove may help to prevent further retracting of the pin nose from the back of the box.

In the case of expansion of tubulars via a rotary expansion method (such as is disclosed in U.S. Pat. No. 6,971,685, issued on Dec. 6, 2005, incorporated herein by reference), the pin tends to increase in length, thereby causing the pin nose to move into engagement with (or toward) the back of the box member. In such a situation, the rib on the pin nose moves forward until a portion of the rib contacts a portion of the groove in the box member. Again, the point of contact between the rib and the groove creates a metal-to-metal seal between the pin and box members.

In an alternative embodiment, the portion of the rib and the portion of the groove that contact when the pin nose retracts can be designed with a reverse trapping angle that forces the nose of the pin member radially outwardly (i.e., toward the outer diameter of the expandable tubular string) as it retracts away from the back of the box member during the expansion process. The reverse trapping angle between the rib and groove forces the pin to remain engaged with the box.

In an alternative embodiment of the invention, an expandable elastomeric sealing ring can be inserted in a groove in the back of the box member such that when certain fluids contact the sealing ring as the pin nose retracts from the back of the box member, the sealing ring expands to fill the gap formed by the pin retracting from the box member thereby forming a secondary resilient seal that aids in containing the internal pressure until the primary metal-to-metal seal is completely formed.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 5 shows the raised rib on the pin nose and the corresponding groove in the box member prior to expansion of the tubulars.

FIG. 7 shows the raised rib on the pin nose and the corresponding groove in the box member prior to expansion of the tubulars.

DESCRIPTION OF ILLUSTRATIVE EMBODIMENTS

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 1:
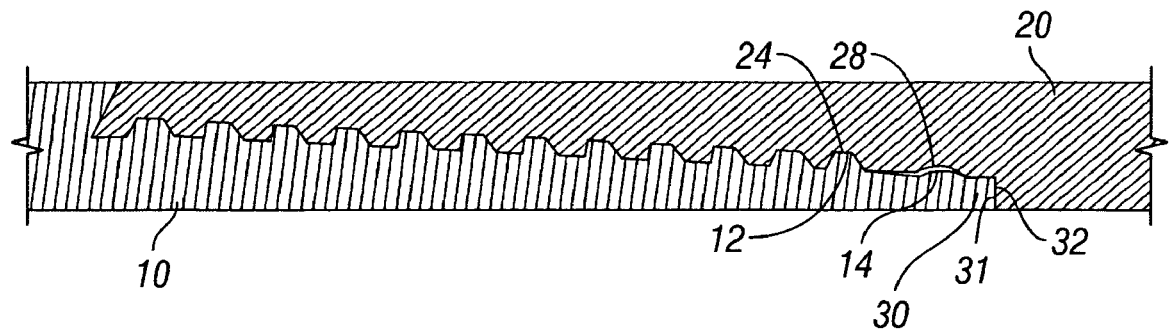
FIG. 1 is a side view of an expandable threaded connection for expandable tubulars according to one embodiment of the present invention prior to expansion of the tubulars.

Referring to FIG. 1, an expandable threaded connection according to the present invention is shown fully made up. The expandable threaded connection of FIG. 1 includes pin member 10 and box member 20 on adjacent segments of expandable tubulars. Pin member 10 includes helical threads 12 extending along its length. Box member 20 includes helical mating threads 24 that are shaped and sized to mate with helical threads 12 respectively on pin member 10 during make-up of a threaded connection between separate tubular joints or segments. The interengaged threads of pin member 10 with the corresponding threads of box member 20 on an adjacent joint provide a threaded connection upon final make-up. In this way, multiple segments of expandable tubulars can be threadably connected.

The helical threads can be machined on plain end tubulars, tubulars with both ends upset, tubulars with one plain end and one upset end, or other connection types as typically used in the oil and gas industry. Additionally, the threads can be selected from a broad range of thread types used in the industry. One of skill in the art can appreciate that the present invention is not limited in application to only certain kinds of tubular ends or thread types. In the preferred embodiment, the thread type is a generally reverse angle hooked type thread, or a modified profile thread as is disclosed and claimed in U.S. Pat. No. 6,767,035 dated Jul. 27, 2004. These threads are preferred for their ability to keep the pin and box members from separating during the expansion process.

The expandable threaded connection of FIG. 1 is shown prior to radial expansion of the expandable tubulars. When the expandable threaded connection is made up, pin nose end 31 (comprising the end of the pin nose 30 of pin member 10) and box surface 32 (located at the back of the box member 20) are in contact, or very nearly in contact, when the expandable threaded connection is made up.

FIG. 1 shows a preformed rib 14 on pin nose 30 residing in groove 28 formed in box member 20. Rib 14 is described as preformed in that it is preformed on pin nose 30 prior to make-up of the threaded connection and, thus, is not created during the expansion process. As shown in FIG. 1, the leading "edge" of rib 14 (i.e., the edge nearest pin nose end 31) is in contact with the back "edge" of groove 28 (i.e., the edge closest to box surface 32) when the connection is made up. The point of contact between the leading edge of rib 14 and the back edge of groove 28 can form a metal-to-metal seal when the connection is made up.

Figure 2:
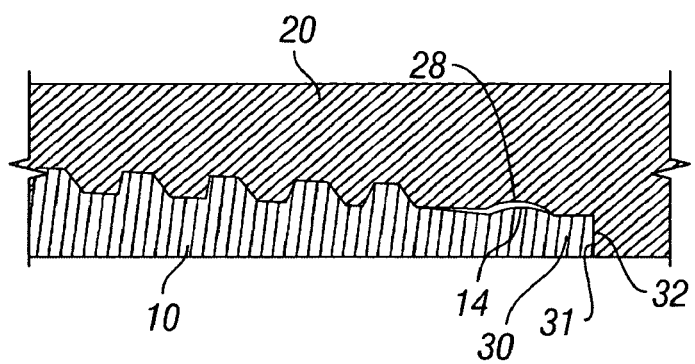
FIG. 2 is an enlarged view of the pin nose and back of the box member of FIG. 1 showing the raised rib on the pin nose and the corresponding groove in the box member prior to expansion of the tubulars.

FIG. 2 shows an enlarged view of pin member 10 and box member 20 of FIG. 1 in the area of rib 14 and groove 28 prior to expansion of the tubulars. As can be seen in FIG. 2, the leading edge of rib 14 is in contact with the back edge of groove 28 when the connection is made up. As can also be seen in FIG. 2, groove 28 in box member 20 is slightly larger than rib 14.

Figure 3:
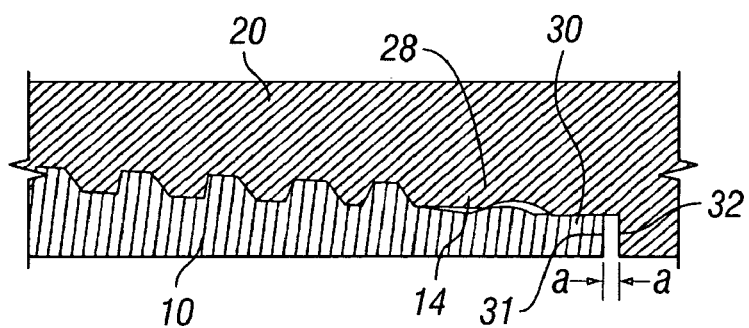
FIG. 3 is an enlarged view of the pin nose and back of the box member of FIG. 1 showing the raised rib on the pin nose and the corresponding groove in the box member after expansion of the tubulars.

FIG. 3 shows an enlarged view of pin member 10 and box member 20 of FIG. 1 in the area of rib 14 and groove 28 after expansion of the tubulars. In the preferred embodiment, the expansion of the tubulars is accomplished by moving or displacing an expansion cone or other expansion tool through the tubulars. As the expansion cone is moved through the tubulars, the radial expansion of the tubulars causes pin nose 30 to shorten, thereby causing pin nose end 31 to "retract" away from the box surface 32. As a result of pin nose 30 retracting, an axial gap (a) is formed between pin nose end 31 and box surface 32.

As the pin nose 30 retracts, rib 14 moves backward (i.e., toward the left in FIG. 3) until the trailing edge of rib 14 (i.e., the edge of rib 14 furthest from pin nose end 31) contacts the front edge of the groove 28 (i.e., the edge of groove 28 furthest from box surface 32). The point of contact between the trailing edge of rib 14 and the front edge of groove 28 creates a metal-to-metal seal between pin member 10 and box member 20.

Because this point of contact between rib 14 and groove 28 is a relatively small area, the axial force acting on the point of contact generates a high bearing pressure that is equal to or greater than the internal pressure within the expandable tubulars. The bearing pressure of the metal-to-metal seal formed by the contact of rib 14 with groove 28 prevents well fluids from migrating past this point of contact. As such, the expansion process creates a high-pressure seal. Additionally, the contact between rib 14 and groove 28 resists or impedes further retracting of the pin nose 30 from the box surface 32, thereby limiting the size of axial gap (a) created during the expansion process.

Figure 4:
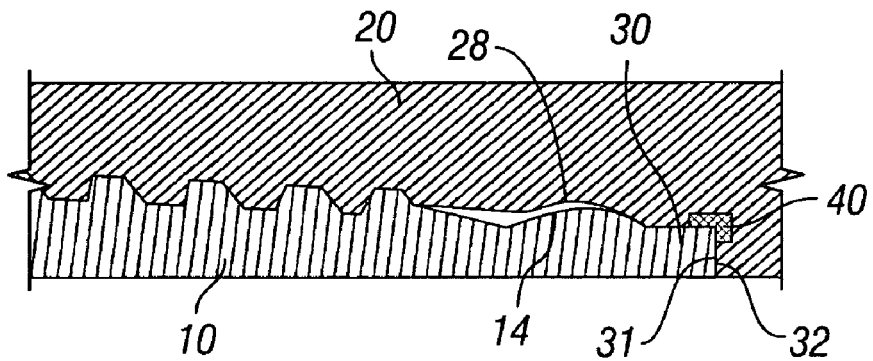
FIG. 4 is a side view of an expandable threaded connection for expandable tubulars according to one embodiment of the present invention in which an expandable elastomeric sealing ring is placed in a groove in the back of the box member of the threaded connection.

To augment the sealing capability of the threaded connection, a resilient seal 40 can be placed in the back of the box member 20 near box surface 32, as shown in FIG. 4. Seal 40 helps seal the threaded connection when the connection is fully made up as well as after expansion of the threaded connection. When the connection is fully made up, pin nose end 31 will engage seal 40 to help seal against well fluids migrating into the threads of the threaded connection. When the pin nose end 31 retracts during the expansion operation, seal 40 helps block any fluid paths through the threaded connection created by the resulting axial gap (a) (shown in FIG. 3) that is formed between the pin nose end 31 and the box surface 32.

While seal 40 can generally be made of any suitable resilient sealing material known in the art, in the preferred embodiment, seal 40 can be made of an "expanding" or "swelling" material that expands or swells when it is contacted by certain fluids. Such a material is disclosed in published United States Patent Application 2004/0017081 A1, which is incorporated herein by reference. More specifically, as fluids enter the axial gap (a) created during the expansion operation, they will contact seal 40. Such contact causes seal 40 to expand or swell, thereby substantially filling the axial gap (a) and preventing the fluids from migrating past seal 40. Seal 40 is a secondary resilient seal that contains the pressure while the metal-to-metal primary seal is being formed.

Figure 5:
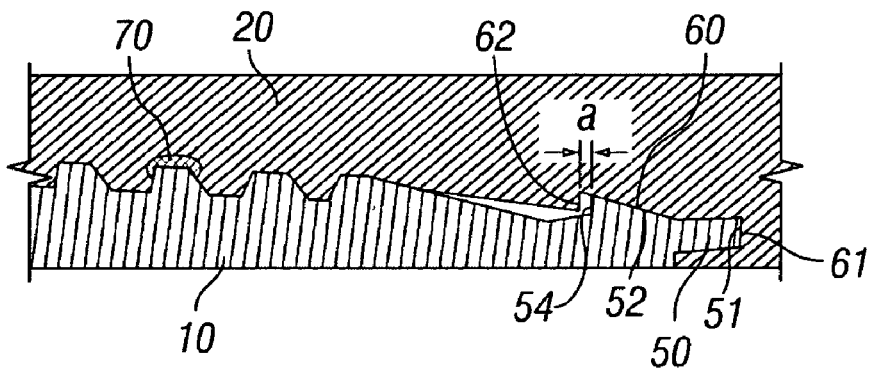
FIG. 5 is a side view of the pin nose and back of the box member of an expandable tubular connection in accordance with an alternative embodiment of the present invention.

FIG. 5 shows an alternative embodiment of the present invention showing an alternative design for pin nose 50. As shown in FIG. 5, pin nose 50 is configured with a triangle shaped preformed rib 52 that has a vertical, or substantially vertical, wall 54 at the trailing edge of rib 52 (i.e., the edge furthest from pin nose end 51). Groove 60 is similarly shaped to mate with rib 52 when the threaded connection is made up. Groove 60 in box member 20 has a vertical, or substantially vertical, wall 62 at the leading edge of groove 60 (i.e., the edge furthest from box surface 61).

As shown in FIG. 5, when the threaded connection is fully made up, pin nose end 51 is in contact with, or very nearly in contact with, box surface 61 at the back of the box member 20 prior to expansion of the threaded connection. In this position, the slanted wall of rib 52 is in contact with the slanted wall of groove 60, and a small axial gap (a) exists between wall 54 of rib 52 and wall 62 of groove 60.

When an expansion cone is moved through the tubulars, the radial expansion of the tubulars causes pin nose 50 to shorten, thereby causing pin nose end 51 to "retract" away from box surface 61. As a result of pin nose end 51 retracting, an axial gap (a) is formed between pin nose end 51 and box surface 61 (as shown in FIG. 6).

As the pin nose 50 retracts, rib 52 moves backward (i.e., toward the left in FIG. 6) until the wall 54 of rib 52 contacts wall 62 of groove 60. The contact between wall 54 of rib 52 and wall 62 of groove 60 creates a metal-to-metal seal between pin member 10 and box member 20. The axial force acting on the point of contact between walls 54 and 62 generates a high bearing pressure that is equal to or greater than the internal pressure within the expandable tubulars. The bearing pressure of the metal-to-metal seal so formed prevents well fluids from migrating past the point of contact between walls 54 and 62. As such, the expansion process creates a high-pressure seal. Additionally, the contact between walls 54 and 62 resists or impedes further retracting of the pin nose end 51 from the box surface 61, thereby limiting the size of axial gap (a) created during the expansion process.

Figure 6:
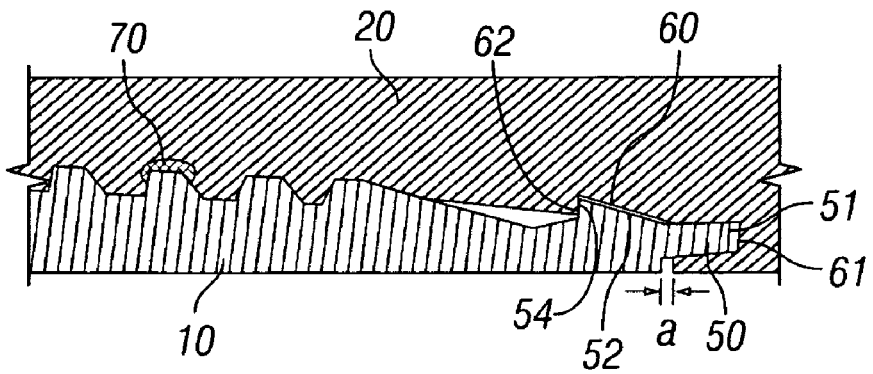
FIG. 6 is a side view of the expandable threaded connection of FIG. 5 showing the raised rib on the pin nose and the corresponding groove in the box member after expansion of the tubulars.

To augment the sealing capability of the threaded connection, a resilient seal 70 can be placed in a groove in the threaded portion of box member 20 between the metal-to-metal seal formed by the contact of walls 54 and 62 and the interengaged threads of the pin member 10 and box member 20 (as shown in FIGS. 5 and 6). Alternatively, the resilient seal 70 can be placed in a groove in the threaded portion of pin member 10.

Figure 7:
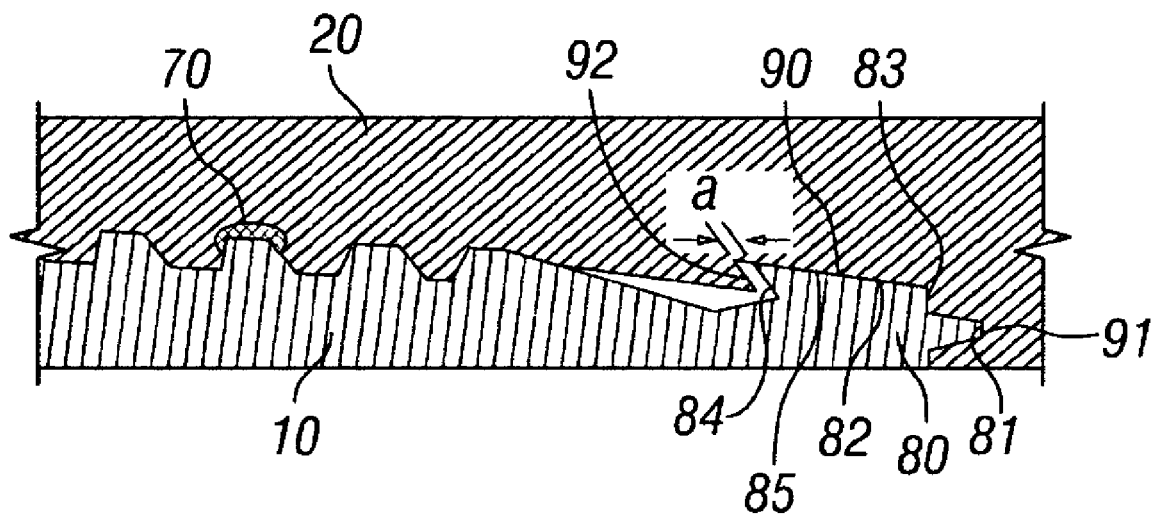
FIG. 7 is a side view of the pin nose and back of the box member of an expandable tubular connection in accordance with an alternative embodiment of the present invention.

FIG. 7 shows an alternative embodiment of the present invention showing an alternative design for pin nose 80. As shown in FIG. 7, pin nose 80 is configured with a rib 82 that is designed with a slanted top wall 85, a vertical (or substantially vertical) front wall 83, and an angled rear wall 84. Groove 90 in box member 20 is similarly shaped to mate with rib 82 when the threaded connection is made up. Groove 90 has an angled rear wall 92 at the leading edge of groove 90 (the wall furthest from box surface 91).

As shown in FIG. 7, when the threaded connection is fully made up, pin nose end 81 is in contact with, or very nearly in contact with, box surface 91 at the back of the box member 20 prior to expansion of the threaded connection. In this position, the slanted top wall 85 of rib 82 is in contact with the slanted wall of groove 90, and a small axial gap (a) exists between angled rear wall 84 of rib 82 and angled rear wall 92 of groove 90.

Figure 8:
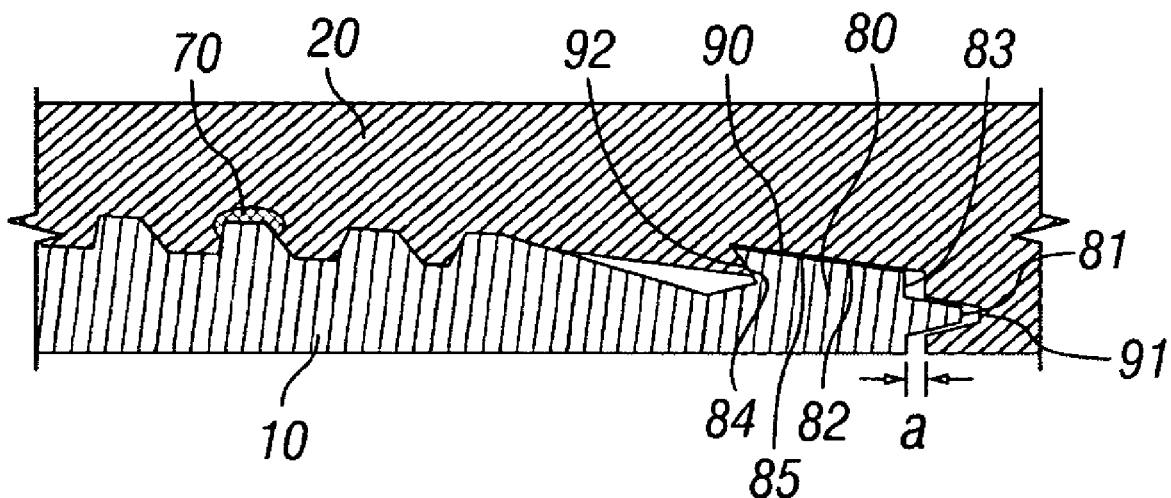
FIG. 8 is a side view of the expandable threaded connection of FIG. 7 showing the raised rib on the pin nose and the corresponding groove in the box member after expansion of the tubulars.

When an expansion cone is moved through the tubulars, the radial expansion of the tubulars causes pin nose 80 to shorten, thereby causing pin nose end 81 to "retract" away from box surface 91. As a result of pin nose end 81 retracting, an axial gap (a) is formed between pin nose end 81 and box surface 91 (as shown in FIG. 8).

As the pin nose 80 retracts, rib 82 moves backward (i.e., toward the left in FIG. 8) until the angled rear wall 84 of rib 82 contacts angled rear wall 92 of groove 90. The contact between angled rear wall 84 of rib 82 and angled rear wall 92 of groove 90 creates a metal-to-metal seal between pin member 10 and box member 20. The axial force acting on the point of contact between angled rear wall 84 and angled rear wall 92 generates a high bearing pressure that is equal to or greater than the internal pressure within the expandable tubulars.

The sealing ability of the expandable connection is enhanced by the "slanting" of angled rear walls 84 and 92. Specifically, by slanting the angled rear wall 84 and angled rear wall 92 as shown in FIGS. 7 and 8, a reverse trapping angle is incorporated into the sliding seal of the present invention. As shown, angled rear wall 84 and angled rear wall 92 have been machined with substantially equal trapping angles. The trapping angle is preferably in the range of 15-25 degrees. The above range of degrees for the reverse trapping angle of angled rear wall 84 and angled rear wall 92 is given by way of example only. One of skill in the art will recognize that the actual measurement of reverse trapping angle can vary greatly depending on numerous characteristics, including, but not limited to, the material of the expandable tubulars, the wall thickness of the pin and box members of the threaded connection, and the amount of radial expansion of the expandable tubulars.

The reverse trapping angle incorporated into the sliding seal of the present invention is designed to force pin nose 80 outwardly as angled rear wall 84 is forced into contact with angled rear wall 92. As pin nose 80 is forced in an outwardly direction, the bearing pressure between slanted top wall 85 of rib 82 and the corresponding slanted wall of groove 90 is increased. A larger trapping angle will cause higher bearing pressure between those surfaces. Both the increased bearing pressure between those surfaces and the increased bearing pressure caused by the forces acting on the surfaces at the trapping angles will produce a high strength metal-to-metal seal between pin member 10 and box member 20. The bearing pressure of the metal-to-metal seal so formed prevents fluids from migrating past the point of contact between angled rear wall 84 and angled rear wall 92. As such, the expansion process creates a high-pressure seal.

Additionally, the contact between angled rear wall 84 and angled rear wall 92 resists or impedes further retracting of the pin nose end 81 from the box surface 91, thereby limiting the size of axial gap (a) created during the expansion process. Further, such contact helps keep the threads of the pin member 10 engaged with the threads of the box member 20.

To augment the sealing capability of the threaded connection, a resilient seal 70 can be placed in a groove in the box member 20 between the metal-to-metal seal formed by the contact of angled rear wall 84 and angled rear wall 92 and the interengaged threads of the pin member 10 and box member 20 (as shown in FIGS. 7 and 8).

One of skill in the art will recognize that alternative embodiments of the present invention may utilize a pin nose and a box member of various shapes. Further, one of skill in the art will recognize that the dimensions of the expandable threaded connection and the geometry and size of the axial gap (a) can vary for given applications. Advanced finite element analysis can be used to aid in determining the optimal dimensions of the expandable threaded connection and the geometry and size of the axial gap that is necessary to be shaped before the expansion process.

One of skill in the art will also recognize that additional alternative embodiments exist in which the locations of the rib and the groove that form the sliding seal of the present invention can be reversed, i.e., the rib can be located on the box member and the groove can be located in the pin member. Additionally, one of skill in the art will appreciate that alternative embodiments exist in which the rib and groove can be placed on both the pin and box members, thereby allowing a coupling member to be used to connect two adjacent tubulars while still allowing for a sliding seal of the present invention to be formed upon expansion of the tubulars.

Further, one of skill in the art will appreciate that the sliding seal of the present invention can be formed when the tubulars are expanded by any known tubular expansion method, including rotary expansion techniques. For example, if the tubulars are expanded by moving an expansion cone through the tubulars, the sliding seal will be created as discussed above. If the tubulars are expanded by a rotary expansion tool, the pin tends to increase in length, thereby causing the pin nose to move into engagement with (or toward) the back of the box member during the expansion process. In such a situation, the pin and box members prior to expansion would look similar to FIG. 3. As the connection is expanded, the rib on the pin nose will move forward until a portion of the rib contacts a portion of the groove in the box member (similar to what is shown in FIG. 2).

Moreover, one of skill in the art will appreciate that the sliding seal of the present invention can be utilized on tubulars that are not connected by traditional threaded means. For example, the sliding seal of the present invention can be utilized on tubulars to be expanded that are made-up through other connection means such as the method of joining expandable tubulars disclosed in United States Published Patent Application 2004/0069498 A1 published on Apr. 15, 2004, which is incorporated herein by reference. When used on such tubulars, the rib and groove (or multiple rib and groove combinations) will be located on concentric sections of the tubulars such that the expansion process creates the seal as explained above.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

The invention claimed is:

1. An expandable threaded tubular connection comprising:
   a first tubular segment with a pin member, the pin member including interengageable thread means, a pin nose and a rib on the pin nose, the pin nose having a pin nose end, the rib being preformed on the pin nose such that the rib is not deformed during radial expansion of the threaded tubular connection;

a second tubular segment with a box member, the box member including interengageable thread means suitable for threadedly engaging the pin member and a groove for receiving the rib, the box member further including a shoulder engaging the pin nose end prior to radial expansion of the threaded tubular connection; and a gap formed between the pin nose end and the shoulder during radial expansion of the threaded tubular connection, wherein the groove in the box member is sized to allow the rib to move within the groove as a result of axial movement of the pin nose during radial expansion of the threaded tubular connection.

2. The expandable threaded tubular connection of claim 1 wherein the pin nose moves axially away from the back of the box member during radial expansion of the threaded tubular connection.

3. The expandable threaded tubular connection of claim 2 wherein the axial movement of the pin nose causes the rib to move within the groove in the box member until a portion of the rib contacts a portion of the groove.

4. The expandable threaded tubular connection of claim 3 wherein the contact between the rib and the groove creates a seal between the pin member and the box member.

5. The expandable threaded tubular connection of claim 1 wherein the rib includes an angled wall forming an end of the rib.

6. The expandable threaded tubular connection of claim 5 wherein the groove in the box member includes an angled wall designed to mate with the angled wall of the rib.

7. The expandable threaded tubular connection of claim 6 wherein the angled wall of the rib and the angled wall of the groove are in contact with each other upon the axial movement of the pin nose.

8. The expandable threaded tubular connection of claim 7 wherein the pin nose is forced outwardly when the angled wall of the rib and the angled wall of the groove are in contact with each other upon the axial movement of the pin nose.

9. The expandable threaded tubular connection of claim 7 wherein the contact between the angled wall of the rib and the angled wall of the groove creates a seal between the pin member and the box member.

10. The expandable threaded tubular connection of claim 1 further comprising a sealing element located at the back of the box member.

11. The expandable threaded tubular connection of claim 10 wherein the sealing element is made from an elastomeric material.

12. The expandable threaded tubular connection of claim 10 wherein the sealing element expands when contacted by a fluid.

13. The expandable threaded tubular connection of claim 1 further comprising a sealing element housed within a groove formed in the box member between two individual threads of the interengageable thread means of the box member.

14. The expandable threaded tubular connection of claim 1 further comprising a sealing element housed within a groove formed in the pin member between two individual threads of the interengageable thread means of the pin member.

15. The expandable threaded tubular connection of claim 1 wherein a leading edge of the rib on the pin nose is in contact with a back edge of the groove of the box member upon makeup of the threaded tubular connection such that the contact creates a metal-to-metal seal when the threaded tubular connection is madeup.

16. A method of sealing a threaded connection for expandable tubulars upon radial expansion of the threaded connection comprising:

providing a pin member on a first tubular segment, the pin member including interengageable thread means, a pin nose, and a rib on the pin nose, the pin nose having a pin nose end, the rib being preformed on the pin nose such that the rib is not deformed during the radial expansion;

providing a box member in a second tubular segment, the box member including interengageable thread means suitable for threadedly engaging the pin member and a groove for receiving the rib, the box member further including a shoulder which engages the pin nose end prior to the radial expansion;

inserting the pin member of the first tubular segment into the box member of the second tubular segment and threadably connecting the first tubular and the second tubular together;

radially expanding the threaded connection between the first tubular and the second tubular, whereby the pin nose moves axially away from the back of the box member during the radial expansion of the threaded connection, thereby creating a gap between the pin nose end and the shoulder; and causing the rib to move within the groove of the box member until a portion of the rib contacts a portion of the groove to form a seal between the pin member and the box member.

17. The method of claim 16 further comprising providing the rib with an angled wall at an end of the rib.

18. The method of claim 17 further comprising providing the groove in the box member with an angled wall for mating with the angled wall of the rib.

19. The method of claim 18 further comprising causing the angled wall of the rib and the angled wall of the groove to contact each other upon the axial movement of the pin nose.

20. The method of claim 19 whereby the contact between the angled wall of the rib and the angled wall of the groove creates a seal between the pin member and the box member.

21. The method of claim 16 further comprising providing a sealing element located at the back of the box member.

22. The method of claim 21 further comprising contacting the sealing element with a fluid, whereby the sealing element expands in response to contact with the fluid.

23. An expandable threaded tubular connection comprising:

a first tubular having a rib formed on its exterior surface such that the rib is not deformed during expansion of the tubular connection, the first tubular further having an end surface;

a second tubular having a shoulder and groove formed in its internal surface, the shoulder engaging the end surface prior to expansion of the tubular connection; and a gap formed between the end surface and the shoulder during expansion, wherein a portion of the second tubular is placed around a portion of the first tubular such that the rib moves within the groove as a result of the axial movement of the first tubular relative to the second tubular during expansion of the tubular connection.

24. The seal tubular connection of claim 23 wherein the axial movement of the first tubular relative to the second tubular causes the rib to move within the groove until a portion of the rib contacts a portion of the groove.

25. The tubular connection of claim 24 wherein the contact between the rib and the groove creates a seal between the first tubular and the second tubular.

26. An expandable threaded tubular connection comprising:
- a first tubular having a shoulder and groove formed in its exterior surface;
- a second tubular having a rib and an end formed on its internal surface such that the rib is not deformed during expansion of the tubular connection, the shoulder and end engaging one another prior to expansion; and
- a gap formed between the shoulder and end during expansion,
- wherein a portion of the second tubular is placed around a portion of the first tubular such that the rib moves within the groove as a result of the axial movement of the first tubular relative to the second tubular during expansion of the tubular connection.

27. The seal tubular connection of claim 26 wherein the axial movement of the first tubular relative to the second tubular causes the rib to move within the groove until a portion of the rib contacts a portion of the groove.

28. The tubular connection of claim 27 wherein the contact between the rib and the groove creates a seal between the first tubular and the second tubular.

29. An expandable threaded tubular connection comprising:
- a first tubular having a rib formed on its exterior surface prior to make-up of the tubular connection;
- a second tubular having a groove formed in its internal surface,
- wherein a portion of the second tubular is placed around a portion of the first tubular such that the rib moves within the groove as a result of the axial movement of the first tubular relative to the second tubular during radial expansion of the tubular connection, and
- wherein the rib is triangle shaped with a vertical or substantially vertical wall at an edge of the rib furthest from a leading edge of the first tubular, the groove being shaped to mate with the rib such that the wall of the rib and a wall of the groove come into contact with each other upon expansion of the tubular connection, thereby forming a seal.

30. An expandable threaded tubular connection comprising:
- a first tubular having a groove formed in its exterior surface; and
- a second tubular having a rib formed on its internal surface prior to make-up of the tubular connection,
- wherein a portion of the second tubular is placed around a portion of the first tubular such that the rib moves within the groove as a result of the axial movement of the first tubular relative to the second tubular during radial expansion of the tubular connection, and
- wherein the groove is triangle shaped with a vertical or substantially vertical wall at an edge of the groove furthest from a leading edge of the first tubular, the rib being shaped to mate with the groove such that the wall of the groove and a wall of the rib come into contact with each other upon expansion of the tubular connection, thereby forming a seal.

31. An expandable threaded tubular connection comprising:
- a first tubular having a rib formed on its exterior surface, wherein the rib comprises:
  - a slanted top wall;
  - a vertical or substantially vertical front wall; and
  - an angled rear wall, and
- a second tubular having a groove formed in its internal surface, the groove being shaped to mate with the rib such that the angled rear wall of the rib and an angled wall of the groove come into contact with each other upon expansion of the tubular connection, thereby forming a seal,
- wherein the angled rear wall of the rib and the angled wall of the groove are both angled at 15-25 degrees.

32. An expandable threaded tubular connection comprising:
- a first tubular having a groove formed in its exterior surface; and
- a second tubular having a rib formed on its internal surface, wherein the rib comprises:
  - a slanted top wall;
  - a vertical or substantially vertical front wall; and
  - an angled rear wall, the groove being shaped to mate with the rib such that the angled rear wall of the rib and an angled wall of the groove come into contact with each other upon expansion of the tubular connection, thereby forming a seal,
- wherein the angled rear wall of the rib and the angled wall of the groove are both angled at 15-25 degrees.

33. A method of sealing a threaded connection upon expansion of the connection comprising:
- providing a pin member, the pin member including threads and a pin nose having a pin nose end, and a rib on the pin nose;
- providing a box member, the box member including threads and a groove for receiving the rib, the box member further including a shoulder;
- inserting the pin member into the box member;
- engaging the pin nose end and shoulder prior to expansion of the connection;
- radially expanding the connection;
- creating a gap between the pin nose end and the shoulder during the expansion;
- preventing the rib from deforming during the expansion; and
- forming a seal between the rib and groove.

* * * * *

UNITED STATES PATENT AND TRADEMARK OFFICE
CERTIFICATE OF CORRECTION

PATENT NO. : 7,798,536 B2  
APPLICATION NO. : 11/201499  
DATED : September 21, 2010  
INVENTOR(S) : Hashem et al.

Page 1 of 1

It is certified that error appears in the above-identified patent and that said Letters Patent is hereby corrected as shown below:

Column 11, Line 19 (Claim 27):   delete "seal"

Signed and Sealed this

First Day of February, 2011

David J. Kappos
*Director of the United States Patent and Trademark Office*